(No Model.)
R. D. LOCKE.
PIPE CUTTER.
No. 386,205. Patented July 17, 1888.
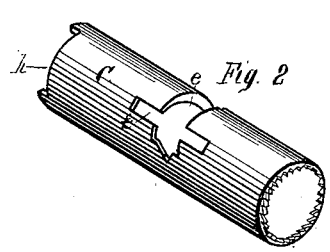
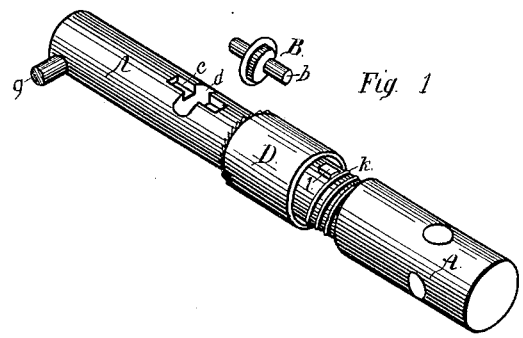
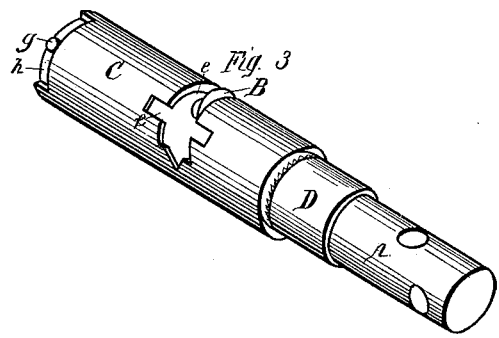
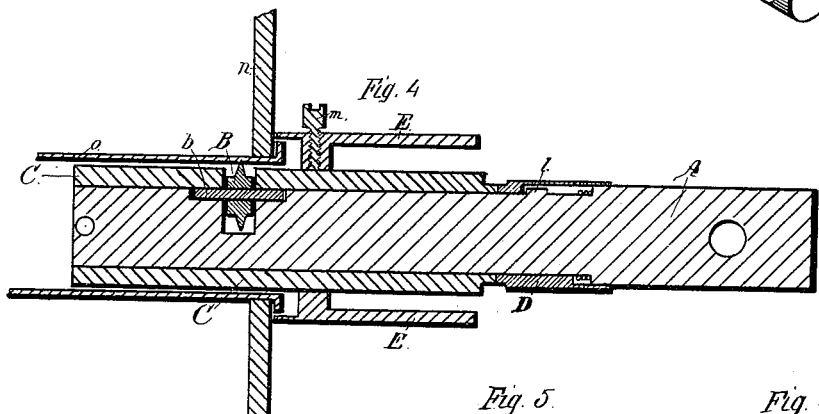
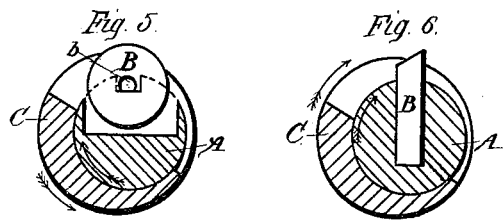
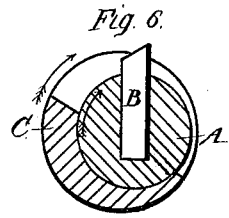
Witnesses: Edward Smith, Jonas Pusey.
Inventor: Robert D. Locke, by Joseph Smith, Attorney.

UNITED STATES PATENT OFFICE.

ROBERT D. LOCKE, OF TITUSVILLE, PENNSYLVANIA.

PIPE-CUTTER.

SPECIFICATION forming part of Letters Patent No. 386,205, dated July 17, 1888.

Application filed March 15, 1888. Serial No. 267,288. (No model.)

*To all whom it may concern:*

Be it known that I, ROBERT D. LOCKE, a citizen of the United States, and a resident of Titusville, in the county of Crawford and State of Pennsylvania, have invented a new and useful Improvement in Flue-Cutters, of which the following is a specification.

My invention relates to that class of cutters designed to cut pipe from the inside, as boiler-flues, where it is wished to cut off new flues at a certain fixed distance outside the flue-sheet, or to cut and remove the old flues where it is wished to cut them inside the flue-sheet; but it may be used to cut any kind of pipe where the point of cutting is near the end, my object being to construct one simple and strong in its several parts and that shall be easily and effectively operated. I accomplish this by the device illustrated in the accompanying drawings, in which—

Figure 1 is a view of the mandrel with the sleeve removed, the ratchet-collar moved forward to uncover the spring and pin, and with the cutter removed from its place and shown by the side of the mandrel; Fig. 2, a view of the sleeve; Fig. 3, a view of the mandrel with the sleeve on and cutter in place; Fig. 4, a longitudinal section of the whole device as inserted in the flue, showing also the guide-collar and sections of the flue and flue-sheet; Fig. 5, a cross-section through the cutter-wheel, and Fig. 6 a cross-section through the cutter when a fixed knife is used instead of the cutter-wheel.

In the several views the same or similar parts are indicated by the same letters.

A is the mandrel, consisting of a solid round bar of iron or steel holding and carrying the cutter B. This cutter is shown in Figs. 1, 3, 4, and 5 as a wheel; in Fig. 6 as a fixed knife. Either may be used, but would require a slight change in the construction of the sleeve and the manner of operating. For the present in the description the wheel-cutter will be understood as referred to. The cutter revolves upon a short pin or axle, $b$, which is fitted to drop into the longitudinal slot $c$ in the mandrel, while the wheel plays in the transverse slot $d$. The slot $c$ is made just wide and deep enough to hold the axle-pin $b$, so that when the sleeve, hereinafter described, is put over the mandrel the pin and wheel are held securely in place, and with the cutting-edge of the wheel of course at right angles with the axle of the mandrel and projecting outward nearly one-half the diameter of the wheel.

C is a sleeve fitted to slip over and fit closely the mandrel A, and with the outside a cylinder of very nearly the diameter of the flue to be cut. The inner and outer circles of the sleeve are eccentric, so that the sleeve is thicker upon the one side than upon the other. Upon one side or semi-circumference is cut the transverse slot $e$, extending from the thinnest to the thickest portion of the sleeve, to allow the cutter B to project through.

In adjusting the centers of the two eccentric circles it must be so that while the thinnest part will allow the cutter to project as much or more than the thickness of the flue to be cut the thickest part will completely cover and protect the cutter. Of course the cutter cannot be put in its place in the mandrel and the sleeve afterward put on. To allow the cutter to be adjusted after the sleeve is put on, a longitudinal slot, $f$, is made in the sleeve at one end of the slot $e$, corresponding to the slot $c$ in the mandrel. When the sleeve is adjusted so that the slots $e$ and $f$ in the sleeve correspond to the slots $d$ and $c$, respectively, the pin $b$, with the cutter B upon it, may be dropped into place and the sleeve revolved slightly upon the mandrel. The pin $b$ is then held securely. After this is done the pin $g$ is inserted in the mandrel and plays in the transverse slot $h$ in the sleeve, allowing a sufficient rotary motion to the sleeve, but very little longitudinal motion. On the mandrel and in rear of the sleeve C is a loose collar, D, having its edge next to the sleeve serrated and meshing into the corresponding serrated edge of the sleeve C. This collar D is held against the sleeve by the spring $k$, and is prevented from turning on the mandrel by the pin $l$, ($k$ and $l$ shown in Fig. 1,) which plays in a longitudinal groove (not shown in the drawings) on the inside of the collar. Thus while the collar is held and made to revolve with the mandrel it is held against the sleeve by the spring $k$, and the serrated edges of the collar and sleeve meshing together the sleeve is rotated forward with the mandrel; but when the mandrel is turned backward the spring yields and allows the mandrel to turn backward inside the sleeve.

To operate the cutter as now constructed, it is necessary to turn the sleeve till the cutter is at the thickest part, when the sleeve entirely covers the cutter. It is now placed in the flue and so adjusted that the cutter shall be at the point where it is desired to cut. The mandrel is now turned backward (the sleeve remaining stationary) until the cutter projects beyond the sleeve and into the inner surface of the flue. The mandrel is now turned forward and a groove is cut in the flue. The mandrel is again turned backward, causing the cutter to project still more; again forward and the groove is cut deeper, this operation being repeated till the flue is cut entirely through. The collar D is then drawn back by the hand, the mandrel turned forward inside the sleeve to its first position, and the cutter is withdrawn from the flue.

If, instead of a wheel-cutter, a stationary knife is used, to set the knife out the mandrel cannot be turned backward, as that would break the knife; but it must be turned forward. This can be done by holding back the collar D by the hand; but to enable the knife to work in this way the transverse slot $e$ in the sleeve must be upon the opposite side of the sleeve, as shown in Fig. 6, so that the knife, in moving forward, shall move from the thickest to the thinnest part. This is shown more clearly in Fig. 6.

In Figs. 5 and 6 the arrow around the outside of the sleeve indicates the direction the cutter is to be turned when cutting the flue, and the arrow on the mandrel indicates the direction the mandrel must be turned inside the sleeve to project the knife.

For convenience of adjusting the cutter so that the flues shall all be cut at the same point, either inside or outside the flue-sheet, a collar, E, (shown in Fig. 4,) is placed over the sleeve C, adjusted to any required position, and held by the set-screw $m$. If in removing old flues it is wished to cut them just inside the flue-sheet $n$, the collar is adjusted, as shown in the drawings, so that when the end of the collar rests against the outside of the flue-sheet the knife is in position to cut the flue O just inside. If used to cut off the ends of new flues, the collar may be reversed, so that the end of the flue shall project within the ring and the knife so adjusted that when the end of the collar rests against the flue-sheet it shall cut just outside the flue-sheet.

I claim as my invention—

1. In a flue-cutter, the mandrel carrying the cutting-knife surrounded by a sleeve filling the space between the outside of the mandrel and the inside of the flue, the sleeve being eccentric and having a transverse slot through which the cutting-knife projects, the mandrel and sleeve being so arranged and connected that the cutting-edge of the knife is projected through and beyond the sleeve more or less, as desired, by the revolution of the mandrel within the sleeve, substantially as shown and described.

2. A flue-cutter consisting of the mandrel A, carrying the cutting-knife B and surrounded by the eccentric-sleeve C, the motions of the sleeve on the mandrel being governed and controlled by the collar D, all the several parts working in combination and connected substantially as shown and described.

ROBERT D. LOCKE.

In presence of—
EDUARD SMITH,
J. J. HOLDEN.